UNITED STATES PATENT OFFICE.

JEFFERSON D. CRAWFORD AND JOSEPH HUGHES, OF SAN FRANCISCO, CALIFORNIA, ASSIGNORS TO CACTUS RUBBER GUM COMPANY, OF PHOENIX, ARIZONA, A CORPORATION OF ARIZONA.

OCOTILLO-GUM SOLUTION.

1,249,034.    Specification of Letters Patent.    Patented Dec. 4, 1917.

No Drawing.    Application filed January 2, 1915. Serial No. 300.

*To all whom it may concern:*

Be it known that we, JEFFERSON D. CRAWFORD, a citizen of the United States, residing at and whose post-office address is 317 Paris street, city and county of San Francisco, State of California, and JOSEPH HUGHES, a subject of the Kingdom of Great Britain, residing at and whose post-office address is 950 Pierce street, at the city and county of San Francisco, State of California, have invented a new and useful Ocotillo-Gum Solution, of which the following is a specification.

This invention consists of ingredients including ocotillo gum extracted from the ocotillo plant (*Fouquieria splendens*) by means of which this gum is held in solution and maintains its liquid state, until the vehicle of suspension is separated by evaporation.

Attention is directed to our co-pending application of even date relating to the process of extracting ocotillo gum, certain commercial peculiarities of which we have discovered; particularly its insolubility in water and other solvents, that it is desired to resist in the application of this invention in the arts.

This present composition of matter will be described in its adaptability to use as a wood filler, for closing the pores and interstices in wood prior to the application of varnish, paint and other commercial finishes; without desiring to be understood as limiting this invention to that specific use, as such a composition of matter has various uses in many different arts unnecessary to particularize herein.

Without pretending to say that ocotillo gum has no chemical solvent we wish to state that we are unaware of any other means of reducing it to a solution as cheaply and effectively as that herein described.

Ocotillo gum in its solid state resembles other vegetable gums and substances of a resinous nature; it may be readily dissolved or melted by the application of heat and water, or an acidulous solution; when so reduced to a liquid state it combines perfectly with water and may be thinned to any extent; the solution so formed will absorb coloring matter and other ingredients having the proper affinities.

A wood filler should be as nearly colorless as possible; should have free flowing liquid qualities to facilitate its spreading and absorption into the pores of the wood or the surface to which it is to be applied. It should have the property of drying hard without "raising the grain" of the wood. It should present when dry a hard even surface to which the varnish or other finish will adhere; and the filler should be proof against discoloration or change of form under the influence of moisture or liquids that might accidentally come in contact with the filler.

This composition of matter as a filler meets all of the requirements as described above, and being as nearly colorless as may be will not obscure the natural grain of the wood that it is desired to fill. If the wood to be finished is naturally or artificially colored it is desirable that the filler should be similarly tinted or colored. Ocotillo gum in the solid state being irreducible by commercially practicable solvents is rendered available by combination with other elements, to form a liquid composition of matter including ocotillo gum, water, or a solution to produce the desired fluidity and coloring matter desired.

Having thus described this invention, one of its uses, the ingredients, and the manner of its composition, what we claim and desire to secure by Letters Patent is:

1. A composition of matter including commercial ocotillo gum (*Fouquieria splendens*) and an aqueous solution.

2. A composition of matter including ocotillo gum and an acid solution.

In testimony whereof, we have hereunto set our hands this 16th day of December 1914.

JEFFERSON D. CRAWFORD.
JOSEPH HUGHES.

Witnesses:
 BALDWIN VALE,
 A. J. HENRY.